Aug. 28, 1934.                D. K. BLAKE                1,971,810
ELECTRICAL DISTRIBUTION SYSTEM
Filed Oct. 22, 1926
Fig. 1.
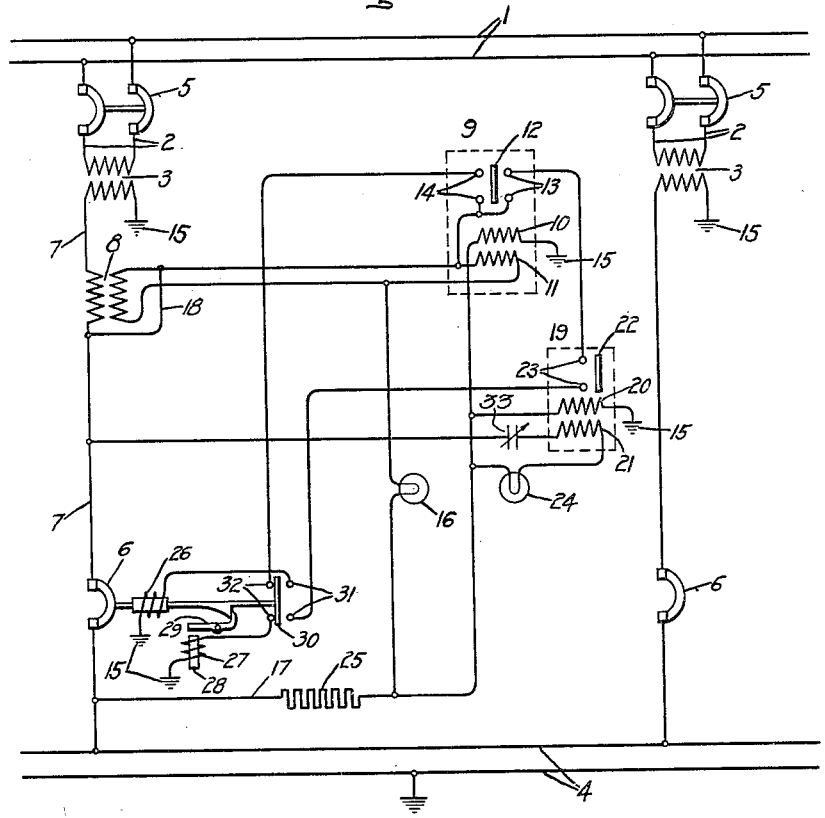
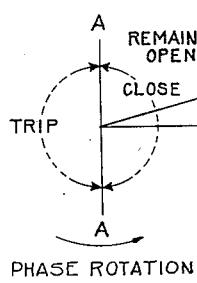
Fig. 2.
PHASE ROTATION
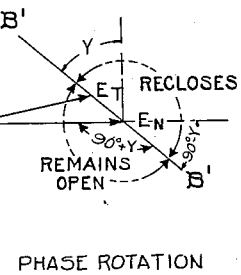
Fig. 3.
PHASE ROTATION
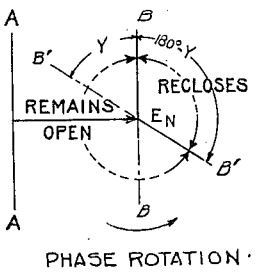
Fig. 4.
PHASE ROTATION
Inventor:
David K. Blake Patented Aug. 28, 1934

1,971,810

UNITED STATES PATENT OFFICE 1,971,810

ELECTRICAL DISTRIBUTION SYSTEM

David K. Blake, Scotia, N. Y., assignor to General Electric Company, a corporation of New York Application October 22, 1926, Serial No. 143,499

40 Claims. (Cl. 175—294)

My invention relates to electrical distribution systems and particularly to improvements in alternating current distribution systems of the type shown in my application, Serial No. 74,188, filed December 8, 1925, and assigned to the same assignee as this application.

An object of my invention is to provide an improved arrangement of apparatus for controlling automatically the connection between two alternating current circuits so that the circuits are disconnected from each other upon the occurrence of predetermined electrical conditions of one of the circuits, and the reconnection of the circuits is effected only in response to a predetermined electrical relation between the circuits which will not effect the immediate disconnection of the circuits when they are reconnected together, that is, under conditions which will not cause the switch periodically to open and close, or to pump, as it is commonly called.

A further object of my invention is to provide an improved arrangement of apparatus which is simple, sensitive, and reliable in operation for disconnecting distribution transformers from a network upon a reversal of energy flow and reconnecting the transformers to the network when the transformer voltage has a predetermined magnitude and a predetermined phase relation with respect to the network voltage.

In accordance with the arrangement disclosed in my aforementioned prior application, a circuit breaker in a low voltage feeder to a network is controlled by a power directional relay to effect the connection and disconnection between a distribution transformer secondary in the feeder and the network in accordance with the direction of current flow in the transformer secondary. This power directional relay is provided with two main operating windings one of which is normally arranged to be energized in accordance with the voltage of the network, and the other of which is energized from a current transformer in the feeder to the network in accordance with the direction of current flow in the current transformer when the circuit breaker is closed. This second winding is also connected in a circuit so as to be energized directly by the voltage difference between the transformer secondary and the network when the circuit breaker is open.

In the above briefly described arrangement, the power directional relay functions as an ordinary reverse power relay when the circuit breaker is closed and as a voltage directional relay when the circuit breaker is open. Hence, this relay performs the two functions of tripping on reversal of energy and reclosing when the incoming circuit is energized. If this relay has the usual pure wattmeter relay characteristics, any current vector on the same side of a vertical axis as the voltage vector, which assume is horizontal and extending to the right, will close the closing contacts of the relay, and any current vector on the opposite side of the vertical axis will close the tripping contacts. When the breaker is open the current coil is responsive to the difference in magnitude and phase of the transformer voltage and network voltage respectively and is arranged to produce a torque to close the closing contacts when the voltage difference vector falls in the closing region of the relay. This prior arrangement with a power directional relay having the characteristics just outlined is suitable for the tripping function and for the reclosing function when the incoming transformer voltage is in phase or leads the network voltage within predetermined limits. Under the usual operating conditions the incoming transformer voltage leads the network voltage by a small angle which is determined by the impedance angle and power factor of the circuit to the network. Under certain conditions, for example, when the feeders are operated with induction regulators, it is possible for the regulators in the respective feeders to be in different relative positions so that the feeder voltage when a circuit breaker is open exceeds the network voltage sufficiently to cause the relay to effect the closing of the circuit breaker, but lags the network voltage sufficiently so that, when the circuit breaker closes, a circulating current flows through the feeders in a direction to produce a resultant current which causes the relay to effect the immediate opening of the circuit breaker. Since the magnitudes and phases of the voltages are such as to effect the reclosing of the circuit breaker as soon as it opens, pumping of the circuit breaker results.

Another instance where pumping may occur is in a system in which a high voltage cable supplies current to a low voltage network through a plurality of transformers. If one of the low voltage circuit breakers fails to open for any reason when a reversal of power occurs, the reverse charging current through the closed circuit breaker causes the voltage on the transformer side of the open circuit breakers to be maintained at a value slightly higher than the network voltage so that the relays associated therewith effect the closing thereof. The voltages of the transformers whose circuit breakers are open under such conditions lag the network voltage. To prevent pumping of a circuit breaker it is therefore very important not to reclose it during a certain range of phase difference between the transformer and network voltages, even though the transformer voltage be as high or slightly higher than the network voltage.

The range of phase difference during which the circuit breaker can be closed without effecting pumping thereof varies with different network systems. My experience shows that in most network systems insurance against pumping may be obtained by arranging the apparatus so that it cannot effect the closing of the circuit breaker when the transformer voltage lags the network voltage more than a predetermined small amount such as 3 to 5 degrees.

It becomes important, therefore, to limit the range of phase difference between the transformer and network voltages during which the reclosing relay can effect the closing of the circuit breaker to an amount which will insure against pumping of the circuit breaker under any operating conditions that may be encountered in practice.

For the purpose of explaining the present invention it has been illustrated in the accompanying drawing as applied to a single phase alternating current distribution system with an interconnected secondary network, but it will be understood that it may be applied equally well to polyphase systems of the same type, and in general to two interconnected electric circuits provided with automatic means for disconnecting the circuits upon a reversal of energy flow and reconnecting the circuits when the electric characteristics of the two circuits are such as to permit power flow in a predetermined direction.

My invention will be better understood from the following description taken in connection with the accompanying drawing, and its scope will be pointed out in the appended claims.

In the drawing, Fig. 1 is a diagrammatic representation of a single phase alternating current distribution system in which my invention has been embodied, Fig. 2 is a vector diagram illustrating the operating characteristics of the main network relay, Fig. 3 is a vector diagram illustrating the operating characteristics of an auxiliary relay cooperating with the network relay, and Fig. 4 is a vector diagram illustrating the operating characteristics of the combination of relays.

Referring to Fig. 1 of the drawing, 1 indicates the primary high voltage mains of a distribution system which is arranged to be energized by any suitable means (not shown). These high voltage mains supply high voltage feeders 2 which are arranged to energize distribution transformers 3 interconnected on their low voltage sides by a load circuit or distributing network 4. Circuit breakers 5 of any suitable type are inserted in the high voltage feeders 2 while network circuit breakers 6 are provided in the low voltage feeders 7 leading from the secondaries of the distribution transformers. In order to simplify the description and drawing, only one feeder is shown equipped with the apparatus for effecting the automatic disconnection and reconnection of the secondary of transformer 3, but it will, of course, be understood that each feeder or any desirable number of feeders may be similarly equipped. An inductive apparatus, such as the current transformer 8, is inserted in series with the circuit breaker 6. The circuit breaker 6 is controlled by a relay 9 of the power directional type. The relay 9 is shown as comprising a potential coil 10, a current coil 11, a contact member 12 and contacts 13 and 14. This relay in the present embodiment of my invention may be of the well known induction type. The usual moving element of the relay is arranged to carry the contact member 12 which is arranged to close contacts 14 in the tripping circuit of circuit breaker 6 for reverse power conditions and to close contacts 13 in the closing circuit of circuit breaker 6 when the breaker is open and the electrical characteristics of the two circuits are such as to permit power flow from the supply circuit to the load circuit.

For simplicity of illustration, I have shown a secondary network which has one side permanently connected to ground. Hence, one terminal of the potential coil 10 is grounded at 15 while the other terminal thereof is connected to the ungrounded side of the network. The potential coil is connected across the network so that when the transformer 3 is deenergized, the circuit breaker 6 open, and the network energized, the relay 9 develops torque in the proper direction to maintain its contacts 13 open and its contacts 14 closed, thereby insuring that the closing coil 26 is not energized at the instant the transformer is energized. It is also desirable to have the relay protect against reclosing when phases are crossed or reversed by workmen during installation or repair work. The current coil 11 is connected across the secondary of transformer 8 and is also connected by means of conductors 17 and 18 across the terminals of circuit breaker 6 through a ballistic resistor 16 and an impedance shown as a resistor 25 in such a manner that the current in the secondary winding of the transformer 8 and the current through the resistors 16 and 25 flow through the coil in the same direction. The resistor 16 should have a hot resistance considerably higher than its cold resistance. An incandescent lamp of the tungsten filament type which has a hot resistance about ten times its cold resistance fulfills this requirement very satisfactorily. This resistor will prevent short-circuiting coil 11 when the breaker is closed and protects the coil when the voltage across the open breaker is high. The impedance of the current transformer 8 at current values passed through the lamp is designed to be much greater than the impedance of the coil 11. Therefore, the connection of the current transformer secondary and the current coil in parallel does not interfere with the relay operation. The current coil of the relay is also arranged to have an impedance small in comparison with the cold resistance of the resistor 16 so that with the resistor cold or hot the current through the current coil is practically in phase with the voltage across the breaker, thereby enabling the relay to operate according to the direction of this voltage as it does according to the direction of the line current.

In order to prevent reclosing on transformer voltages that lag the network voltage more than a predetermined amount, I provide an additional relay 19 to cooperate with relay 9 to effect reclosing of circuit breaker 6. This relay may be similar in construction and type to relay 9. The relay 19 is shown as comprising a potential coil 20, a phasing coil 21, contacts member 22, and a contact 23. The potential coil 20 is connected to be responsive to the network voltage. The phasing coil 21 is connected to be responsive to the voltage across the terminals of circuit breaker 6. In series with phasing coil 21, I place a ballistic resistor 24, which, for example, may be an incandescent lamp of the tungsten filament type. This protects the phasing coil against shortcircuit when the circuit breaker is closed and protects it against excessive voltage difference when the circuit breaker is open. The contacts 23 of this relay are connected in series with the closing contacts 13 of relay 9. The relay 19 is designed so that its characteristic which is dependent upon a predetermined function of the transformer and network voltages when the switch 6 is open is different from the characteristic of the relay 9, which is also dependent upon a predetermined function of the transformer and network voltages when the switch 6 is open. The desired characteristic of the relay 19 may be obtained in any well known manner such as by connecting inductance or capacitance in the circuit of one or both of its windings so as to change the electrical constants thereof, or by connecting the windings to different phases when the relay is used in connection with a polyphase system and varying the electrical constants of either or both coil circuits, if necessary. If, for example, in the particular embodiment of my invention shown in the drawing, the circuits of the windings 10 and 20 of the relays 9 and 19 respectively are designed so that the currents through the windings 10 and 20 lag the impressed voltages 90° and the circuit of the winding 11 of relay 9 is designed so that the current through the winding 11 is in phase with the impressed voltage, the desired characteristic of the relay 19 may be obtained by connecting a suitable adjustable reactance, such as an adjustable condenser 33, in series with the winding 21 of the relay 19 so that the current through the winding 21 leads the voltage impressed across the circuit thereof.

The impedance 25, shown as a resistance, is also inserted in a circuit from the potential coils 10 and 20 of the respective relays 9 and 19 to the network. This connection is to insure against insufficient excitation of the potential coils in case it is desirable to close the breaker on a deenergized network. Otherwise, if the impedance of the network load is low as compared to the impedance of the voltage coils, the condition might arise in which the load circuit would shunt most of the excitation current from the voltage coils so that the relays would not develop sufficient torque to close their contacts 13 and 23 respectively although the electrical conditions were such that the associated circuit breaker should close.

As shown, the circuit breaker 6 is of the well known latched-in type and is provided with a closing coil 26 which, when energized, closes the circuit breaker, and with an opening coil 27, which, when energized, actuates a plunger 28 to release a latch 29 to permit the breaker to open. Auxiliary switching means shown as a contact member 30 is associated with the circuit breaker and is arranged to close contacts 31 in the closing coil circuit when the circuit breaker is in its open position and to close contacts 32 in the opening coil circuit when the circuit breaker is in its closed position.

Before describing the operation of the particular embodiment of my invention, it will be convenient to refer to Figs. 2 to 4, inclusive, which are vector diagrams illustrating the principles by which the desired characteristics are obtained for tripping and reclosing of the breaker. Fig. 2 shows the operating characteristics of the relay 9, which has a true wattmeter characteristic. The vector $E_N$ represents the network voltage which is impressed on the winding 10. The line AA, which is drawn at right angles to the network voltage $E_N$ at its origin, is the locus of the currents through coil 11 producing zero torque in the relay. Hence any current in the coil winding 11 which does not lead or lag the network voltage 90° or more falls to the right of the line AA and will cooperate with the current in the winding 10 to close contacts 13. Any current in the coil 11 which does lead or lag the network voltage more than 90° will fall to the left of the line AA and will cooperate with the current in the winding 10 to close contacts 14. The current winding 11 is so connected to the current transformer secondary that when the power flow is from the transformer 3 to the network 4 the current vector is to the right of the line AA so that the relay contacts 13 are maintained closed and when the power flow is in the opposite direction the current vector falls to the left of the line AA so that the relay contacts 14 are closed.

Since the current through the current coil 11, when the circuit breaker 6 is open, is substantially in phase with the voltage across the circuit breaker terminals, the relay will operate according to the phase relation between this voltage and the network voltage, as it does according to the phase relation of the load current to the network voltage when the circuit breaker is closed.

In Fig. 2, $E_T$ represents the transformer secondary voltage and $E_T E_N$ represents the voltage difference across the circuit breaker when it is open. If we assume a constant network voltage $E_N$ and that the relay 9 has a wattmeter characteristic, the torque of the relay is zero when the voltage $E_T E_N$ falls on the vertical line BB drawn at right angles to $E_N$ at its terminus and has a torque in the closing direction when $E_T E_N$ is to the right of line BB and has a torque in the tripping direction when the voltage $E_T E_N$ is to the left of the line BB. Therefore, it will be observed from Fig. 2 that the voltage $E_T$ has to be at least as great as $E_N$ in order for the relay 9 to close its contacts 13, and the greater the phase angle between voltages $E_N$ and $E_T$, the greater $E_T$ has to be in order to produce a closing torque in the relay. Therefore, for any given network voltage $E_N$ the relay 9 will maintain its contacts 13 open and its contacts 14 closed when the phase and magnitude of the transformer secondary voltage $E_T$ is such that its terminus is to the left of the line BB drawn at right angles to the voltage $E_N$ at the terminus thereof, and will open its contacts 14 and close its contacts 13 when the phase and magnitude of the voltage $E_T$ is such that its terminus is to the right of the line BB.

Fig. 3 shows the reclosing characteristic of the relay 19. Instead of having a true wattmeter characteristic in which the torque is proportional to $E_N \times E_T E_N \times \cos \phi$ where $\phi$ is the angle between the voltages $E_N$ and $E_T E_N$, the relay is so connected and arranged that the torque is proportional to $E_N \times E_T E_N \times \cos (\phi - Y)$ where Y is a predetermined angle. This angle Y may be made any desired value in any suitable manner well known in the art as by varying the constants of the circuits of the relay windings. With such an arrangement the line B'B', which is the locus of the transformer voltage $E_T$ producing zero torque in the relay 19, is a line drawn through the terminus of $E_N$ at an angle of 90°+Y therefrom. If the magnitude and phase of the transformer voltage $E_T$ is such that its terminus is to the right of the line B'B', the relay 19 closes its contacts 23, whereas if its terminus is to the left of the line B'B', relay 19 maintains its contacts 23 open. It will be observed from Figs. 2 and 3 that, when the transformer voltage $E_T$ leads the network voltage $E_N$, a smaller transformer voltage causes the relay 19 to close its contacts 22 than is required to close the contacts 13 of relay 9. When the angle Y is made large enough to prevent lagging transformer voltages, which would produce pumping, from effecting the reclosing of the circuit breaker, the angle between the network voltage $E_N$ and the line B'B' becomes so small that leading transformer voltages of such small magnitude can effect the closing of the circuit breaker under conditions which will cause pumping. Therefore, this is one of several reasons why a single relay having the general reclosing characteristic shown in Fig. 3 cannot be used.

It will be observed also that a greater transformer voltage is required to close contacts 22 of relay 19 than is required to close contacts 13 of relay 9 when the transformer lags the network voltage and that a transformer voltage $E_T$ which lags the network voltage $E_N$ more than $90-Y$ degrees cannot produce a torque in the relay 19 which will cause the relay 19 to close its contacts 23.

If now the relays, having the different characteristics indicated in Figs. 2 and 3, have their closing contacts in series, the reclosing characteristic shown in Fig. 4 is obtained. When the transformer voltage $E_T$ leads the network voltage less than 90° and its magnitude is such that its terminus is to the right of the line BB, the torques developed in both relays 9 and 19 are in the proper direction to effect the closing of their respective contacts 13 and 23. When, however, the transformer voltage $E_T$ leads the network voltage $E_N$ more than 90°, the terminus of the transformer voltage $E_T$ is always to the left of the line BB so that the relay 9 maintains its contacts 13 open and its contacts 14 closed. The closing of the circuit breaker 6 is thereby prevented even though the phase and magnitude of the leading transformer voltage $E_T$ may be such as to cause the contacts 23 of relay 19 to be closed. When the transformer voltage $E_T$ lags the network voltage less than $90°-Y$ and the magnitude of the transformer voltage $E_T$ is such that its terminus is to the right of the line B'B', the torques developed in both relays 9 and 19 are in the proper direction to effect the closing of their respective contacts 13 and 23. When, however, the transformer voltage lags the network voltage more than $90°-Y$ the terminus of $E_T$ is always to the left of the line B'B' so that the relay 19 maintains its contacts 23 open and thereby prevents the closing of the circuit breaker although the phase and magnitude of the lagging transformer voltage $E_T$ may be such as to cause the contacts 13 of relay 9 to be closed.

Therefore, it will be observed that the combination of relays having the particular reclosing characteristics shown in Figs. 2 and 3 permits the reclosing of the circuit breaker only when the transformer voltage $E_T$ leads the transformer voltage $E_N$ less than 90° and when the transformer voltage $E_T$ lags the network voltage $E_N$ less than $90°-Y$. The reclosing region, which is 180° when only the relay 9 is used, is limited to $180°-Y$ when both of the relays 9 and 19 with their contacts 13 and 23 in series are used. Therefore, in accordance with the embodiment of my invention shown in the drawing the reclosing of the circuit breaker is limited to a range of phase relation of the voltages materially less than 180°, which is the range when only one relay is used.

As mentioned heretofore, my experience has shown that in most systems the range of phase difference during which the circuit breaker may be closed without effecting pumping is from a point where the transformer voltage lags the network voltage a materially small amount such as 3 to 5 degrees which is substantially in phase lagging relation with the network voltage to a point where it leads the network voltage a predetermined amount. It is obvious, however, that the range of phase difference between the voltages during which the circuit breaker can be closed may be limited to any desired range by using relays having the proper overlapping characteristics without departing from my invention.

The operation of the embodiment of my invention shown in Fig. 1 is as follows: Assume that the network is energized by means of one feeder and that circuit breakers 5 and 6 in the other feeder equipped with the automatic reclosing equipment are in the open position. Assume now that circuit breaker 5 is moved to the closed position so that the distribution transformer 3 is energized from the supply mains 1. Potential coil 10 will be energized from the network and the current coil 11 being in a series circuit between the secondary of transformer 3 and the network will be energized in accordance with the difference in magnitude and phase of the voltages of the two circuits. Now, since the current through the coil 11 is in phase with the voltage across the breaker, the relay will operate according to the direction of this voltage, if it is within the reclosing region indicated on Fig. 2 to effect movement of contact member 12 toward the right to close relay contacts 13 in the closing circuit of circuit breaker 6. In a similar manner potential coil 20 of relay 19 is energized from the network and phasing coil 21 is energized in accordance with the voltage difference between the two circuits. In this case, however, a voltage difference vector within a different operating region as indicated on Fig. 3 will effect movement of contacts member 22 to close contact 23, also in the closing circuit of circuit breaker 6. When this voltage vector falls within the operating region for reclosing, as indicated on Fig. 4, that is, when the transformer voltage has a predetermined lead or has a predetermined lag with respect to the network voltage and also has the proper magnitude, contacts 13 and 23 will be in a closed position simultaneously. Since circuit breaker 6 is in the open position a circuit is completed for the closing coil 26 from the secondary of transformer 3, conductor 7, transformer 8, conductor 18, contacts 13, contacts 23, contacts 31, closing coil 26 to the ground 15. Upon the energization of closing coil 26, circuit breaker 6 is moved to its closed position and latch 29 takes its illustrated position and holds the breaker closed.

Now, if circuit breaker 5 in the same feeder is opened, transformer 3 will take its magnetizing current from the network. Since the direction of energy flow is in the reverse direction a current vector will be obtained to the left of the line AA in Fig. 2. The relay 9 will now operate over the tripping region and contact member 12 will be moved to close contacts 14 in the tripping circuit of circuit breaker 6. Upon closure of contacts 14, a circuit is completed to energize opening coil 27 which actuates its plunger 28 to disengage latch 29 and thereby permit circuit breaker 6 to move to its open position. In this new position of the breaker, auxiliary switch member 30 closes contacts 31 in the circuit of the closing coil 26 so that the closing coil circuit will be in a condition to be energized upon the proper operation of relays 9 and 19. The same cycle of operation will take place if there is a reversal of energy flow due to a fault or shortcircuit on feeder 2 or transformer 3.

If circuit breaker 5 is again closed and the transformer voltage both in magnitude and phase is such as to permit energy flow from the transformer secondary to the network, relays 9 and 19 will be instrumental in completing the closing circuit for circuit breaker 6 in the same manner as previously described.

While in the embodiment of my invention illustrated the relay 9 and the relay 19 are each directional relays, producing torques in one direction or the other according to circuit conditions, it will be apparent to those skilled in the art that my invention is not limited to the particular arrangement illustrated since the cooperative relationships which I have pointed out as distinguishing my invention can be carried out in various ways.

The reclosing operation is the same when the circuit breaker 5 is closed and the network is not energized. Due to the resistor 25, which is connected in series with the resistor 16 across the terminals of the circuit breaker 6, sufficient voltage is impressed across the voltage windings 11 and 20 of the relays 9 and 19 respectively when the switch 5 is closed to produce sufficient torque in the relays to close their contacts 13 and 22 respectively even though a very low impedance load is connected to the network.

It will be obvious to those skilled in the art that changes and modifications may be made in the construction and arrangement of parts without departing from my invention. It will also be obvious that my invention is not limited to the interconnection of circuits utilizing a power transformer between circuits or to a plurality of feeders interconnecting two circuits so long as the circuits may be independently energized, and I, therefore, aim in the appended claims to cover all such changes and modifications as fall within the true spirit and scope of my invention.

What I claim as new and desire to secure by Letters Patent of the United States, is:

1. In combination, two electric circuits, a switch for connecting said circuits together, a directional relay responsive to electrical characteristics of said circuits for controlling automatically the opening and closing of said switch, and means responsive to electrical characteristics of said circuits for predetermining the range of the difference between the electrical characteristics of said circuits to which said directional relay responds within which said directional relay can effect a predetermined operation of said switch.

2. In combination with a supply circuit and a load circuit, a switch adapted to connect said circuits together, a directional relay for controlling said switch to effect the connection and disconnection between said circuits in response to electrical characteristics of said circuits, and means responsive to electrical characteristics of said circuits operating in conjunction with the directional relay for predetermining the range of the difference between the electrical characteristics to which said directional relay responds within which said directional relay can effect the operation of said switch for connecting said circuits together.

3. In combination, two alternating current electric circuits, a switch for connecting said circuits together, a directional relay responsive to the direction of power flow between said circuits for controlling the opening of said switch and responsive to electrical characteristics of said circuits for controlling the closing of said switch, and means responsive to the electrical characteristics of said circuits to which said directional relay responds in controlling the closing of said switch for changing the range between said last mentioned electrical characteristics over which said directional relay can effect closing of said switch.

4. In combination, two alternating current electric circuits, a switch for connecting said circuits together, a power directional relay responsive to the direction of power flow between said circuits for controlling the opening of said switch and responsive to the voltages of said circuits for controlling the closing of said switch, and means responsive to the voltage difference between the voltage of said circuits to which said directional relay responds in controlling the closing of said switch for changing the operating range over which said power directional relay can effect closing of said switch.

5. In combination, two electric circuits, a switch provided with opening and closing means for connecting said circuits together, a directional relay responsive to electrical characteristics of said circuits and having contacts for controlling the operation of said opening and closing means, and a second directional relay responsive to electrical characteristics of said circuits having contacts in series relation with the contacts of said first mentioned directional relay for predetermining the range of the difference between the electrical characteristics of said circuits to which said first mentioned directional relay responds within which said first mentioned relay can effect closing of said switch.

6. In combination, two alternating current electric circuits adapted to be independently energized, a switch for connecting said circuits together, a power directional relay responsive to the direction of power flow between said circuits for controlling the opening of said switch and responsive to the voltages of said circuits for controlling the closing of said switch, and means responsive to the voltage difference between said voltages to which said directional relay responds and cooperating with said power directional relay for preventing the closure of said switch when one of the voltages to which said directional relay responds lags another of the voltages to which said relay responds sufficiently to effect periodic opening and closing of said switch.

7. In an alternating current system of distribution, a supply circuit, a load circuit, a plurality of feeder circuits arranged in multiple for feeding energy to said load circuit, a switch in each feeder circuit, and a plurality of directional relays in each feeder circuit having different and overlapping operating characteristics for controlling automatically the opening and closing of said switch.

8. In an alternating current system of distribution, a supply circuit, a load circuit, a plurality of feeder circuits arranged in multiple and adapted to interconnect said circuits, a switch in each feeder circuit, a power directional relay associated with each switch for controlling the opening and closing thereof, and a directional relay having different operating characteristics than said power directional relay and cooperating therewith for effecting the closing operation of a switch within a different range of phase difference between said supply circuit and said load circuit voltages than if said power directional relay were alone effective.

9. In an alternating current system of distribution, a supply circuit, a load circuit, a plurality of feeder circuits arranged in multiple for feeding energy to said load circuit, a switch in each feeder circuit, and a plurality of relays for controlling the opening and closing of each of said switches having energizing windings connected in a circuit to render one of said relays responsive to the direction of current between said circuits, when said switch is closed and both of said relays responsive to the magnitude and phase relation of same voltages between said circuits when said switch is open, one of said relays being effective to close said switch within a predetermined range of phase difference between said voltages of said circuits and the other of said relays being effective to close said switch within a different predetermined range of phase difference of said voltages, whereby closing of said switch may be effected within a different range of phase difference between the voltages of said circuits than if one of said relays were alone effective.

10. In an alternating current system of distribution, a supply circuit, a load circuit, a plurality of feeder circuits arranged in multiple and adapted to interconnect said circuits, a switch in each feeder circuit, switch actuating means effective when energized to open and close said switch, a power directional relay having contacts to control the energization of said switch actuating means to effect the opening and closing of said switch, and a directional relay responsive to the difference in voltage between said circuits with different operating characteristics than said power directional relay and having contacts in series with the closing contacts of said power directional relay for modifying the operating limits within which said power directional relay can effect closing of said switch.

11. In an alternating current system of distribution, a supply circuit, a load circuit, a plurality of feeder circuits arranged in multiple for feeding energy to said load circuit, a transformer in each feeder circuit, a switch in the secondary circuit from each transformer, a power directional relay in the secondary circuit for opening said switch upon a reversal of energy flow in said feeder and for controlling the reclosing of said switch in response to a predetermined relation between a secondary transformer voltage and a network voltage, and a directional relay cooperating with said power directional relay to effect reclosing of said switch when said secondary voltage of said transformer has a predetermined magnitude and the range of phase angle with respect to said predetermined network voltage falls within predetermined unequal limits of lead and lag respectively.

12. In an alternating current system of distribution, a supply circuit, a load circuit, a plurality of feeder circuits arranged in multiple for feeding energy to said load circuit, a transformer in each feeder circuit, a switch in the secondary circuit from each transformer, a power directional relay in the secondary circuit of each transformer for opening said switch upon a reversal of energy flow in said feeder, and a directional relay having different operating characteristics than said power directional relay and cooperating therewith to effect reclosing of said switch with a smaller degree of lag between said transformer voltage and said load circuit voltage than if said power directional relay were alone effective.

13. The combination of an alternating current network arranged to be fed at a plurality of points, a feeder circuit, a circuit breaker in said feeder circuit, power directional means for opening said circuit breaker in response to the flow of power from said network to said feeder circuit, and a plurality of relays respectively dependent upon the relative voltages of said network and feeder circuit when said switch is open and having different but overlapping operating characteristics during a predetermined range of phase difference between the network and feeder circuit voltages for effecting the closing of said circuit breaker only when said relative voltages cause all of said relays simultaneously to occupy predetermined positions.

14. The combination of a low voltage alternating current network arranged to be fed at a plurality of points, a high voltage feeder circuit, a transformer connected between said feeder circuit and network, a switch in the secondary circuit of said transformer, means for opening said switch in response to the flow of power from said network to said transformer, a closing circuit for said switch, a plurality of contacts in series in said closing circuit, a relay responsive to a predetermined function of a transformer secondary voltage and the corresponding network voltage while said switch is open for maintaining one of said contacts closed during a predetermined range of phase difference between said voltages, and another relay responsive to a different predetermined function of said voltages while said switch is open for maintaining another of said contacts closed during a different range of phase difference between said voltages.

15. In an alternating current system comprising a low voltage distribution network arranged to be fed at a plurality of points, a high voltage feeder, a transformer connected between said feeder and network, a switch between said transformer and network, power directional means for controlling the opening of said switch in response to power flow from the network to the feeder, electroresponsive means dependent upon the relative values of a feeder voltage and a network voltage and operative to effect the closing of said switch during a predetermined range of phase difference between said voltages, and means dependent upon the relative phases of said voltages for limiting the range of phase difference of said voltages during which said electroresponsive means can effect the closing of said switch to a range which will not cause pumping of the switch.

16. The combination of an alternating current network arranged to be fed at a plurality of points, a feeder, a switch connecting said feeder to said network, means for opening said switch in response to the flow of power from the network to the feeder, means dependent upon the relative values of a feeder voltage and a network voltage when said switch is open and operative to effect the closing of said switch during a predetermined range of phase difference between said voltages when said transformer voltage is leading the network voltage, and means dependent upon the phase difference between said voltages when the switch is open for limiting the closing of said circuit breaker to a portion of said predetermined range of phase difference.

17. The combination of a low voltage alternating current network arranged to be fed at a plurality of points, a high voltage feeder circuit, a transformer connected between said feeder and network, a switch in the secondary circuit of said transformer, means for opening said switch in response to the flow of power from said network to said feeder circuit, a closing circuit for said switch, two series connected contacts in said closing circuit, a relay responsive to a predetermined relation between predetermined transformer secondary and network voltages for maintaining one of said contacts closed during a predetermined range of phase difference of said voltages when the transformer voltage leads the network voltage, and another relay dependent upon a predetermined phase relation between said voltages for maintaining the other contact closed during a different range of phase difference of said voltages when the transformer voltage leads the network voltage.

18. In an alternating current system comprising a distribution network arranged to be fed at a plurality of points, a feeder circuit, a circuit breaker between said feeder circuit and network, power directional means for opening said circuit breaker in response to flow of power from the network to said feeder circuit, means dependent upon the relative magnitudes of predetermined feeder circuit and network voltages and operative to effect the closing of said circuit breaker during a predetermined range of phase difference between said voltages, and additional means dependent upon the relative phases of said voltages when the circuit breaker is open for limiting the closing of said circuit breaker to a portion of said predeterimned range of phase difference.

19. In an alternating current system comprising a distribution network arranged to be fed at a plurality of points, a feeder circuit, a circuit breaker between said feeder circuit and network, power directional means for opening said circuit breaker in response to power flow from the network to the feeder circuit, means for closing said circuit breaker dependent upon the relative magnitudes of a predetermined feeder circuit voltage and a predetermined network voltage, and additional means dependent upon the relative phases of a feeder circuit and network voltages when a circuit breaker is open for limiting the range of phase difference during which said closing means can effect the closing of the circuit breaker when the feeder circuit voltage lags the network voltage to an angle which will not cause power to flow from the network to the feeder circuit to cause said power directional means again to open the circuit breaker.

20. In an alternating current system of distribution, an alternating current feeder, an alternating current network, a transformer having its primary connected to said feeder and its secondary connected to said network, a switch in the secondary circuit of said transformer, power directional means responsive to the flow of power from said network to said feeder for effecting the opening of said switch, and means responsive to predetermined relations between the transformer secondary voltage and the network voltage when the switch is open for effecting the closing thereof only during a range of phase difference between said voltages which is materially less than 180° and for preventing closing thereof when the transformer voltage lags the network voltage and is greater than the network voltage.

21. In an alternating current system of distribution, an alternating current feeder, an alternating current network, a transformer having its primary connected to said feeder and its secondary connected to said network, a switch in the secondary circuit of said transformer, means responsive to the flow of power from said network to said feeder for effecting the opening of said switch, a relay responsive to a predetermined relation between the transformer secondary voltage and the network voltage when the switch is open, and another relay responsive to a different predetermined relation between the transformer secondary voltage and the network voltage when the switch is open and cooperating with said other relay to effect the closing of said switch only during a range of phase difference between the network voltage and the resultant of the transformer secondary voltage and the network voltage from a substantially in phase lagging relation to a phase relation where the resultant voltage leads the network voltage materially less than 180°.

22. The combination of a low voltage alternating current network arranged to be fed at a plurality of points, a high voltage feeder, a transformer connected between said feeder and network, a switch in the secondary circuit of said transformer, and means for automatically opening and reclosing said switch in response to predetermined conditions of said feeder and network comprising a plurality of directional relays having different and overlapping operating characteristics for controlling the operation of said switch so as to prevent pumping thereof.

23. The combination with a circuit, of a circuit interrupter therefor and interrupter-closing means including a separate phasing relay for closing the circuit interrupter dependent upon the magnitude and phase position of the voltage across the open interrupter falling within approximately a 90 degree range only, and means for tripping the interrupter on any reverse current of appreciable magnitude.

24. In combination with two alternating-current circuits, switching means for connecting said circuits and means for controlling said switching means comprising a control circuit, a plurality of contact means in the control circuit, a relay connected and arranged to be energized in accordance with the phase relation between the electromotive forces of said circuits for maintaining one of said contact means closed during a predetermined range of phase difference between the electromotive forces, and a relay connected and arranged to be energized in accordance with the phase relation between said electromotive forces for closing another of said contact means during another predetermined range of phase difference, said means for controlling the switching means also including opening means responsive to phase position of currents through the closed switching means.

25. The combination with a circuit, of a circuit-interrupter and interrupter-control means including means for closing the circuit-interrupter only when the voltage across said interrupter will cause a current to flow after the interrupter closes which current will maintain it closed, said closing means including means allowing the interrupter to close only when the voltage on the supply side of the interrupter is substantially equal to, or greater than, the voltage on the load side of the interrupter and only when said voltage on the supply side of the interrupter leads, or is substantially in phase with, the voltage on the load side of the interrupter.

26. An alternating-current distribution system including a plurality of feeders, a transformer in each feeder, a load circuit connected to said transformers, a switch between each transformer and its source of power, a circuit-interrupter between each transformer and said load circuit, and interrupter-control means including means for closing the circuit-interrupter only when the voltage across said interrupter will cause a current to flow after the interrupter closes which will maintain it closed, said closing means including means allowing the interrupter to close only when the voltage on the supply side of the interrupter is substantially equal to, or greater than, the voltage on the load side of the interrupter and only when said voltage on the supply side of the interrupter leads, or is substantially in phase with, the voltage on the load side of the interrupter, and opening means responsive to the phase position of interrupter current.

27. The combination with a circuit, of a circuit-interrupter and interrupter-control means including means for closing the circuit-interrupter only when the voltage across the open interrupter leads the voltage on the load side of the interrupter from approximately 0 to approximately 90 degrees and means for tripping said interrupter on any appreciable load-current reversal which either leads or lags the voltage on the load side on the interrupter.

28. An alternating-current distribution system including a plurality of feeders, a transformer in each feeder, a load circuit connected to said transformers, a switch between each transformer and its source of power, a circuit-interrupter between each transformer and said load circuit, and interrupter-control means including means for closing the circuit interrupter only when the voltage across the open interrupter leads the voltage on the load side of the interrupter from approximately 0 to approximately 90 degrees and means for tripping said interrupter on any appreciable load-current reversal which either leads or lags the voltage on the load side of the interrupter.

29. The combination with a circuit, of a circuit interrupter and interrupter-control means including means for closing the circuit-interrupter dependent upon the magnitude and phase position of the voltage across the interrupter when it is open and means for opening said interrupter depending upon the magnitude and phase position of the current flowing through it when it is closed, said closing and opening means allowing the interrupter to close only when the voltage across the open interrupter falls within approximately a 90 degree range and allowing the interrupter to open when the current through the interrupter is reversed and falls within approximately a 180 degree range, and having an angle between its opening and closing curves on the lead side of the network voltage less than the angle between the voltage across the open interrupter and the current which will flow through the interrupter after it closes and having an angle between the opening and closing curves on the lag side of the network voltage greater than the angle between the voltage across the open interrupter and the current which will flow through it after it closes.

30. An alternating-current distribution system including a plurality of feeders, a transformer in each feeder, a load circuit connected to said transformers, a switch between each transformer and its source of power, a circuit interrupter between each transformer and said load circuit, and interrupter-control means including means for closing the circuit interrupter dependent upon the magnitude and phase position of the voltage across the interrupter when it is open and means for opening said interrupter depending upon the magnitude and phase position of the current flowing through it when it is closed, said closing and opening means allowing the interrupter to close only when the voltage across the open interrupter falls within approximately a 90 degree range and allowing the interrupter to open when the current through the interrupter is reversed and falls within approximately a 180 degree range and having an angle between its opening and closing curves on the lead side of the network voltage less than the angle between the voltage across the open interrupter and the current which will flow through the interrupter after it closes and having an angle between its opening and closing curves on the lag side of the network voltage greater than the angle between the voltage across the open interrupter and the current which will flow through it after it closes.

31. The combination with a circuit, of a circuit interrupter and interrupter-control means including means for closing the circuit interrupter dependent upon the magnitude and phase position of the voltage across the open interrupter when said voltage does not lag the voltage on the load side of the interrupter appreciably and means for tripping the interrupter on any leading or lagging reverse currents of appreciable magnitude.

32. An alternating-current distribution system including a plurality of feeders, a transformer in each feeder, a load circuit connected to said transformers, a switch between each transformer and its source of power, a circuit-interrupter between each transformer and said load circuit, and interrupter control means including means for closing the circuit interrupter dependent upon the magnitude and phase position of the voltage across the open interrupter when said voltage does not lag the voltage on the load side of the interrupter appreciably and means for tripping the interrupter on any leading or lagging reverse currents of appreciable magnitude.

33. The combination with a circuit, of a circuit-interrupter therefor and interrupter-control means including means for closing the circuit-interrupter only under voltage conditions which will cause a current to flow after the interrupter closes which will maintain it closed, said closing means including means permitting the interrupter to close through approximately a 90 degree range only of phasing voltages.

34. The combination of a plurality of feeder circuits for energizing a load circuit, each feeder circuit including a transformer energized from a source of power, a circuit-breaker between the source of power and the transformer, a network interrupter between the transformer and the load circuit and network-interrupter control means including means for closing the network interrupter only under voltage conditions which will cause a current to flow after the interrupter closes which will maintain it closed, said means including means permitting the interrupter to close through approximately a 90 degree range only of phasing voltages.

35. The combination with a circuit, of a circuit interrupter therefor and interrupter-control means including means for closing the circuit interrupter only under voltage conditions which will cause a current to flow after the interrupter closes which will maintain it closed, said means including a separate phasing relay for permitting the interrupter to close through approximately a 90 degree range only of phasing voltages.

36. The combination of a plurality of feeder circuits for energizing a load circuit, each feeder circuit including a transformer energized from a source of power, a circuit breaker between the source of power and the transformer, a network interrupter between the transformer and the load circuit and network-interrupter control means including means for closing the interrupter only under voltage conditions which will cause a current to flow after the interrupter closes which will maintain it closed, said means including an independent phasing relay for allowing the interrupter to close through approximately a 90 degree range only of phasing voltages or of voltages across the interrupter break contacts.

37. The combination with a circuit, of a circuit interrupter therefor and interrupter-control means including means for closing the circuit interrupter only when the voltage across said interrupter will cause a current to flow after the interrupter closes to maintain it closed, said means including a separate relay means for allowing the interrupter to close only when the voltage on the supply side of the interrupter is substantially equal to or greater than the voltage on the load side of the interrupter and only when said voltage on the supply side of the interrupter leads or is substantially in phase with the voltage on the load side of the interrupter.

38. The combination of a plurality of feeders supplying a load circuit, of circuit-interrupters therefor and interrupter-control means employing means including a relay responsive only to voltages across the interrupter and across the load circuit for closing the circuit interrupter only when the voltage across the open interrupter leads the voltage on the load side of the interrupter from approximately 0 to approximately 90 degrees, and means for tripping said interrupter on any appreciable load current reversal which either leads or lags the voltage on the load side of the interrupter.

39. In combination with two alternating-current circuits and means for controlling the interconnection of said circuits, a control circuit, means connected and arranged to be energized in accordance with the phase relation between the electromotive forces of said alternating-current circuits operable to effect a connection in the control circuit only during a limited range of phase difference between electromotive forces when the difference between their frequencies is less than a predetermined value, and means responsive to the phase relation between said electromotive forces operable within said range to control another connection in the control circuit, said inter-connection means including opening means responsive to abnormal currents through the circuits controlled by the inter-connection means.

40. The combination with a plurality of circuits for feeding a network load circuit, of a transformer in each circuit, a circuit interrupter between each transformer and the load circuit, and control means for each interrupter including opening means responsive to the phase position of current through the closed interrupter and including closing means responsive to approximately equal in-phase load circuit and transformer voltages, said closing means including one relay responsive to one phase-difference range of voltages and another relay responsive to a different phase-difference range of voltages.

DAVID K. BLAKE.